(12) United States Patent
Uchida et al.

(10) Patent No.: US 8,814,742 B2
(45) Date of Patent: *Aug. 26, 2014

(54) WELDED STRUCTURE AND WELDING METHOD

(75) Inventors: Keisuke Uchida, Nagoya (JP); Shingo Iwatani, Miyoshi (JP); Takahito Endo, Toyota (JP); Go Kuramoto, Aichi (JP); Jun Kamitake, Toyota (JP); Hirokazu Tsunekawa, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 42 days.

This patent is subject to a terminal disclaimer.

(21) Appl. No.: 13/264,201

(22) PCT Filed: Jan. 22, 2010

(86) PCT No.: PCT/JP2010/050773
§ 371 (c)(1),
(2), (4) Date: Oct. 13, 2011

(87) PCT Pub. No.: WO2011/089706
PCT Pub. Date: Jul. 28, 2011

(65) Prior Publication Data
US 2012/0094798 A1  Apr. 19, 2012

(51) Int. Cl.
*F16H 57/08* (2006.01)
*F16H 48/06* (2006.01)

(52) U.S. Cl.
USPC ............ 475/220; 475/230; 475/901; 403/270

(58) Field of Classification Search
CPC ..................... F16H 2048/382; F16H 2048/385
USPC ............................ 475/220, 230, 901; 403/270
See application file for complete search history.

(56) References Cited

U.S. PATENT DOCUMENTS

| | | | |
|---|---|---|---|
| 5,806,373 A | 9/1998 | Parker | |
| 6,193,137 B1 | 2/2001 | Ezumi et al. | |
| 6,527,470 B2 * | 3/2003 | Ezumi et al. | 403/270 |
| 8,002,167 B2 * | 8/2011 | Zuber et al. | 228/135 |
| 2001/0007717 A1 | 7/2001 | Ezumi et al. | |
| 2002/0081148 A1 | 6/2002 | Ezumi et al. | |
| 2002/0081149 A1 | 6/2002 | Ezumi et al. | |
| 2012/0295125 A1 | 11/2012 | Uchida et al. | |
| 2012/0325047 A1 * | 12/2012 | Cripsey | 74/606 R |

FOREIGN PATENT DOCUMENTS

| | | | |
|---|---|---|---|
| CN | 1212194 | | 3/1999 |
| EP | 1 719 572 A2 | | 11/2006 |
| JP | 62-38787 | | 2/1987 |
| JP | 3-14066 | | 2/1991 |
| JP | 7-284926 | | 10/1995 |
| JP | 8-1327 | | 1/1996 |
| JP | 10-113783 | | 5/1998 |
| JP | 10-231918 | | 9/1998 |
| JP | 2002-514511 | | 5/2002 |
| JP | 2005-081351 | | 3/2005 |
| JP | 2005081351 A | * | 3/2005 |
| JP | 2009-226643 | | 10/2009 |
| JP | 2009-250339 | | 10/2009 |
| JP | 2011167746 A | * | 9/2011 |
| WO | WO 2011/089704 A1 | | 7/2011 |

OTHER PUBLICATIONS

International Search Report in International Application No. PCT/JP2010/050773; Mailing Date: Apr. 27, 2010.

* cited by examiner

*Primary Examiner* — Tisha Lewis
(74) *Attorney, Agent, or Firm* — Finnegan, Henderson, Farabow, Garrett & Dunner, LLP

(57) ABSTRACT

A welded structure and welding method make it possible to improve welding strength and welding quality. A welded structure in which a first member and a second member are joined by welding, wherein the first member comprises a second-member joining part which is joined to the second member, and the second member comprises a first-member joining part which is joined to the first member. If the direction in which the first member and the second member are arranged is the first direction, and the direction intersecting the first direction is the second direction, the welded structure comprises a cavity part which is provided between the first-member joining part and the second-member joining part, and a welded part which is provided between the cavity part and both end parts in the second direction of the joining surface where the first-member joining part and the second-member joining part are joined.

11 Claims, 12 Drawing Sheets

WELDED STRUCTURE AND WELDING METHOD

CROSS-REFERENCE TO RELATED APPLICATIONS

This application is a national phase application of International Application No. PCT/JP2010/050773, filed Jan. 22, 2010, the contents of which are incorporated herein by reference.

TECHNICAL FIELD

The present invention relates to a welded structure of plural parts joined together by welding such as, for example, a differential case and a ring gear of a differential device (differential gear) of an automobile, and a welding method.

BACKGROUND ART

One example of a welded structure of plural parts joined together by welding is a welded structure between, for example, a differential case and a ring gear of a differential device (hereinafter, "differential gear") of an automobile. FIG. 11 shows a conventional example of a welded structure between a conventional differential case 100 and a ring gear 102. A hypoid gear is formed in a teeth portion 102a of the ring gear 102. In the conventional example of FIG. 11, a groove 104 is provided in the joint surface between the differential case 100 and the ring gear 102. Thus, compressive stress and shear stress on weld beads 105 caused by a load applied in directions shown in the drawing in actual operation of the differential gear are less concentrated on a weld bead end 105a.

However, in a conventional example in which a helical gear is formed in a teeth portion 106a of a ring gear 106 as shown in FIG. 12, the load is applied repeatedly in directions indicated respectively by solid line arrows and broken line arrows in actual operation of the differential gear. This causes compressive stress and tensile stress to be generated repeatedly at both ends in the central axis direction of the ring gear 106 (up and down direction of the drawing) of the joint surface between the differential case 108 and the ring gear 106. In the conventional example of FIG. 12, weld beads 109 are formed only from one side in the central axis direction of the ring gear 106 of the joint surface between a differential case 108 and the ring gear 106. Therefore one end of the weld beads 109 may be repeatedly subjected to large compressive stress and tensile stress, which may result in insufficient weld strength. Even if a groove 110 is provided in the differential case 108 in its joint surface with the ring gear 106, such groove cannot provide an effect of reducing stresses applied to the end on the groove 110 side of the weld beads 109.

Patent Document 1 discloses a technique in which a flange member is disposed between a small gear wheel member and a large gear wheel member, and the flange member is joined to the large gear wheel member with the outer periphery of the flange member being in contact with the inner periphery of the large gear wheel member such that it is welded from both sides in the central axis direction of the large gear wheel member.

RELATED ART DOCUMENTS

Patent Documents

Patent Document 1: JP 10(1998)-231918A

DISCLOSURE OF THE INVENTION

Problems to be Solved by the Invention

In the technique of Patent Document 1, there is a possibility that weld quality is lowered due to a large number of blow holes caused by gas that may be generated and remain inside the weld beads when welding the large gear wheel member from both sides in the central axis direction thereof. Further, there exists a non-welded portion between weld beads on both sides. When the weld (welded portion) contracts on cooling after welding, such a non-welded portion inhibits the contraction, whereby tensile stress remains at the interface between the weld beads and non-welded portion. As the weld beads on both sides are repeatedly subjected to compressive stress and tensile stress, such residual tensile stress at the interface between the weld beads and the non-welded portion may initiate cracks from this interface between the weld beads and the non-welded portion into the weld beads or thermally affected parts, therefore sufficient weld strength may not be obtained.

Accordingly, the present invention was made to solve the above problem and has an object to provide a welded structure and a welding method with which weld strength and weld quality can be improved.

Means of Solving the Problems

One aspect of the present invention made to solve the above problem provides a welded structure of a first member and a second member joined together by welding, wherein the first member includes a second member joint portion joined to the second member, the second member includes a first member joint portion joined to the first member, when the first member and the second member are aligned along a first direction and a second direction is a direction intersecting the first direction, the welded structure includes a cavity formed between the first member joint portion and the second member joint portion, and a welded portion formed between the cavity and each end in the second direction of a joint surface where the first member joint portion and the second member joint portion are joined together.

In this aspect, gas that may be generated during welding can be exhausted into the cavity, so that formation of blow holes is suppressed. Also, stress that may act to lower weld strength hardly remains at the interface of the joined portion between the first member and the second member on cooling after welding. Thus, weld strength and weld quality are improved.

In the above aspect of the present invention, it is preferable to include a through hole extending from outside into the cavity.

In this configuration, gas exhausted into the cavity during welding can escape from the through hole, so that formation of pin holes in the welded portion is prevented. The through hole also allows for observation of the inside of the cavity to check if the welded portion has been formed through to the cavity, so that weld quality is improved. Also, any water droplets due to possible condensation inside the cavity on cooling after welding can be drained from the through hole.

Therefore, corrosion of the welded portion can be prevented.

In the above aspect of the present invention, preferably, the first member is an annular member whose radial direction coincides with the first direction, the welded structure includes a press-fit portion on one of an inner peripheral surface of the first member and an abutment surface of the first member joint portion of the second member that abuts against the inner peripheral surface for allowing press-fit to be made with a press-fit interference between the inner peripheral surface and the abutment surface.

In this configuration, the second member is press-fitted into the first member, or, the first member is press-fitted into the second member. Thus, the first member and the second member are maintained in their positions during welding. Therefore, weld distortion can be reduced.

In the above aspect of the present invention, preferably, the cavity includes a first cavity and a second cavity, the first cavity and the second cavity are arranged respectively on both sides of the press-fit portion in the second direction.

In this configuration, when performing welding, for example laser welding, from both ends in the second direction of the joint surface, i.e., from two directions, the irradiated laser beam is interrupted by the press-fit portion. Therefore the welded portion already formed by a laser beam irradiated from one side can be prevented from being re-heated by a laser beam irradiated from the other side. Also, even when welding is performed simultaneously from the above-noted two directions, the laser beams irradiated from the two directions do not interfere with each other.

In the above aspect of the present invention, preferably, the cavity is formed by a groove provided at least to one of the first member and the second member.

Accordingly, the tolerable amount of gas exhausted into the cavity can readily be adjusted by adjustment of the groove depth.

In the above aspect of the present invention, preferably, the second member is made of a material that generates more gas when molten than the first member, and the welded portion is formed along a direction inclined toward the first member side relative to the joint surface.

Accordingly, the melting amount of the second member that generates more gas when molten can be reduced during welding, so that formation of blow holes is suppressed.

According to another aspect, the present invention provides a welded structure of a first member and a second member joined together by welding, wherein the first member includes a second member joint portion joined to the second member, the second member includes a first member joint portion joined to the first member, when the first member and the second member are aligned along a first direction and a second direction is a direction intersecting the first direction, the welded structure includes a welded portion formed at least at each end in the second direction of a joint surface where the first member joint portion and the second member joint portion are joined together, the second member is made of a material that generates more gas when molten than the first member, and the welded portion is formed along a direction inclined toward the first member side relative to the joint surface.

In this aspect, the melting amount of the second member that generates more gas when molten can be reduced during welding. Accordingly, formation of blow holes is suppressed.

In the above aspect of the present invention, preferably, the first member is a ring gear of a differential gear, and the second member is a differential case which is a housing member of the differential gear.

Accordingly, stress applied to the welded portion caused by an external force on the ring gear in actual operation of the differential gear is reduced, and also, formation of blow holes in the welded portion can be suppressed. Thus, weld strength and weld quality of the welded portion between the differential case and the ring gear are improved.

According to another aspect, the present invention provides a welding method for joining a first member and a second member together by welding, wherein, when the first member and the second member are aligned along a first direction, and a second direction is a direction intersecting the first direction, for joining together a second member joint portion provided to the first member to be joined to the second member and a first member joint portion provided to the second member to be joined to the first member, a cavity is formed between the first member joint portion and the second member joint portion, and welding is performed from both ends of the joint surface in the second direction so as to form welds between both ends of the joint surface in the second direction and the cavity.

In this aspect of the present invention, preferably, the first member or the second member is formed with a through hole extending from outside into the cavity.

In the above aspect of the present invention, preferably, the first member is formed in an annular form such that its radial direction coincides with the first direction, the first member joint portion of the second member is formed with an abutment surface to be abutted against an inner peripheral surface of the first member, and the first member and the second member are press-fitted to each other with a press-fit interference between the inner peripheral surface and the abutment surface.

According to another aspect, the present invention preferably provides a welding method for joining a first member and a second member together by welding, wherein, when the first member and the second member are aligned along a first direction, and a second direction is a direction intersecting the first direction, for joining together a second member joint portion provided to the first member to be joined to the second member and a first member joint portion provided to the second member to be joined to the first member, the second member is made of a material that generates more gas when molten than the first member, and welding is performed from both ends of the joint surface in the second direction so as to form welds along a direction inclined toward the first member side relative to the joint surface at least at both ends of the second direction of the joint surface where the first member joint portion and the second member joint portion are joined together.

Effects of the Invention

With the welded structure and the welding method according to the present invention, weld strength and weld quality can be improved.

MODE FOR CARRYING OUT THE INVENTION

Hereinafter, embodiments of the present invention will be described in detail with reference to the accompanying drawings. In this embodiment, a welded structure between a differential case and a ring gear in a differential gear will be described as one example.

Example 1

First, the overall welded structure of this example will be described.

Figure 1:
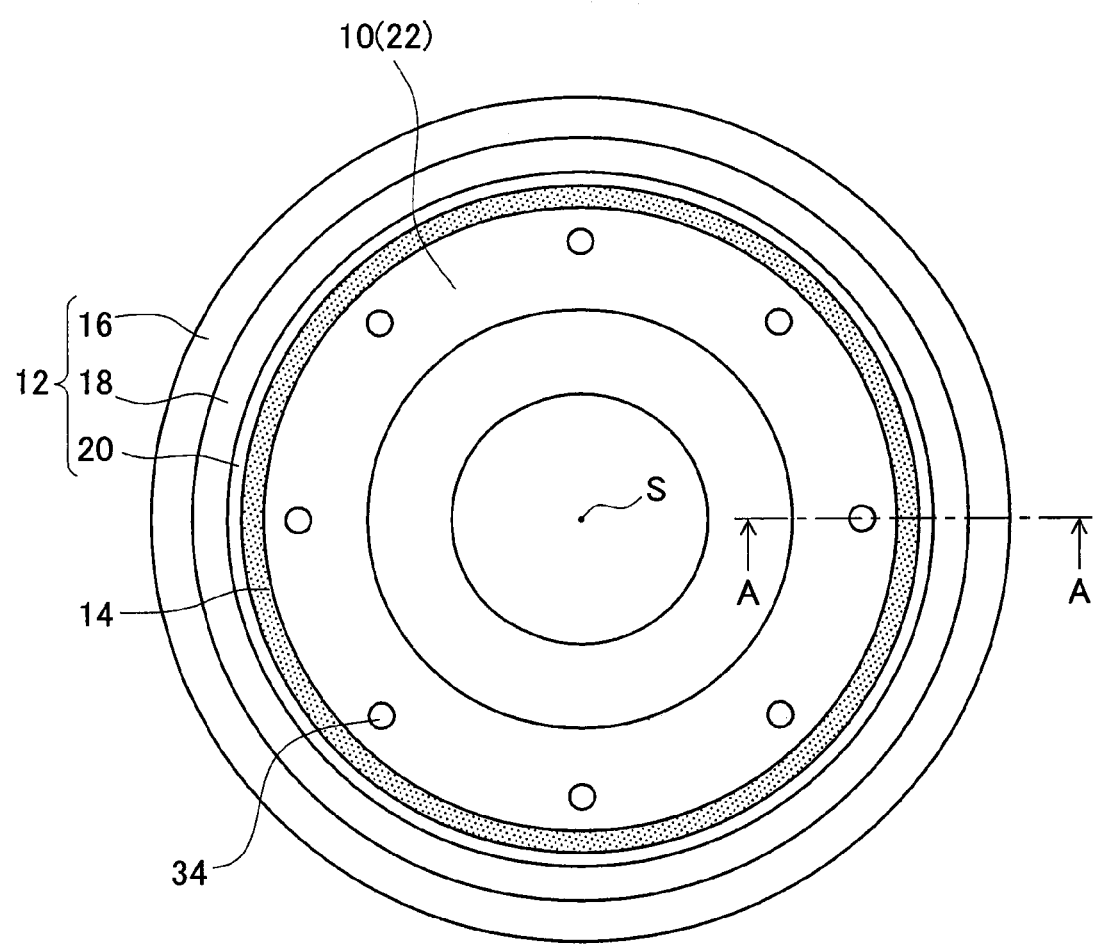
FIG. 1 is a plan view of a welded structure between a differential case and a ring gear.

FIG. 1 is a plan view of a welded structure between a differential case 10 and a ring gear 12. The differential case 10 is shown partially, i.e., only the vicinity of its joint portion to the ring gear 12 is shown.

As shown in FIG. 1, the differential case 10 and the ring gear 12 are joined by welding, with the differential case 10 being inserted into the inner periphery of the annular ring gear 12. First weld beads 14, which are the weld or welded portion formed when joining the differential case 10 and the ring gear 12 by welding, are formed in an annular shape along the inner periphery of the ring gear 12. Here, the differential case 10 is one example of a "second member" in the claims. The ring gear 12 is one example of a "first member" in the claims. In this example, welding is performed from two directions on both sides of the ring gear 12 with respect to the central axis S direction of the ring gear 12 (direction perpendicular to the paper plane of FIG. 1, direction orthogonal to the radial direction of the ring gear 12). As will be described later, second weld beads 38 (see FIG. 3) which are the weld or welded portion on the side opposite to the side shown in FIG. 1 are formed in an annular shape along the inner periphery of the ring gear 12 similarly to the first weld beads 14.

The differential case 10 is a housing member accommodating therein components for transmitting power (such as a pinion shaft, a pinion gear, a side gear) to a drive shaft (not shown). The ring gear 12 is a gear wheel member meshing with a drive pinion (not shown) that transmits power from an engine (not shown). The differential case 10 is made of cast iron, while the ring gear 12 is made of steel.

Figure 2:
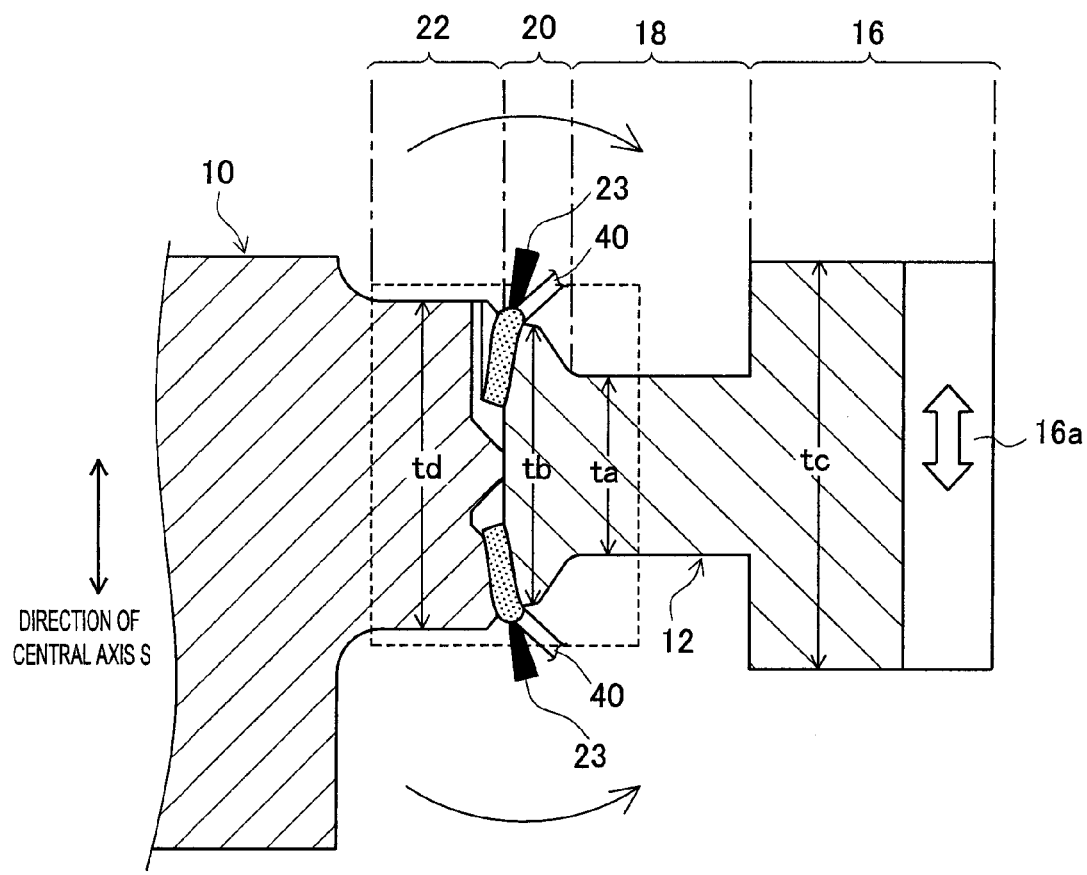
FIG. 2 is a cross section along A-A in FIG. 1.
Figure 3:
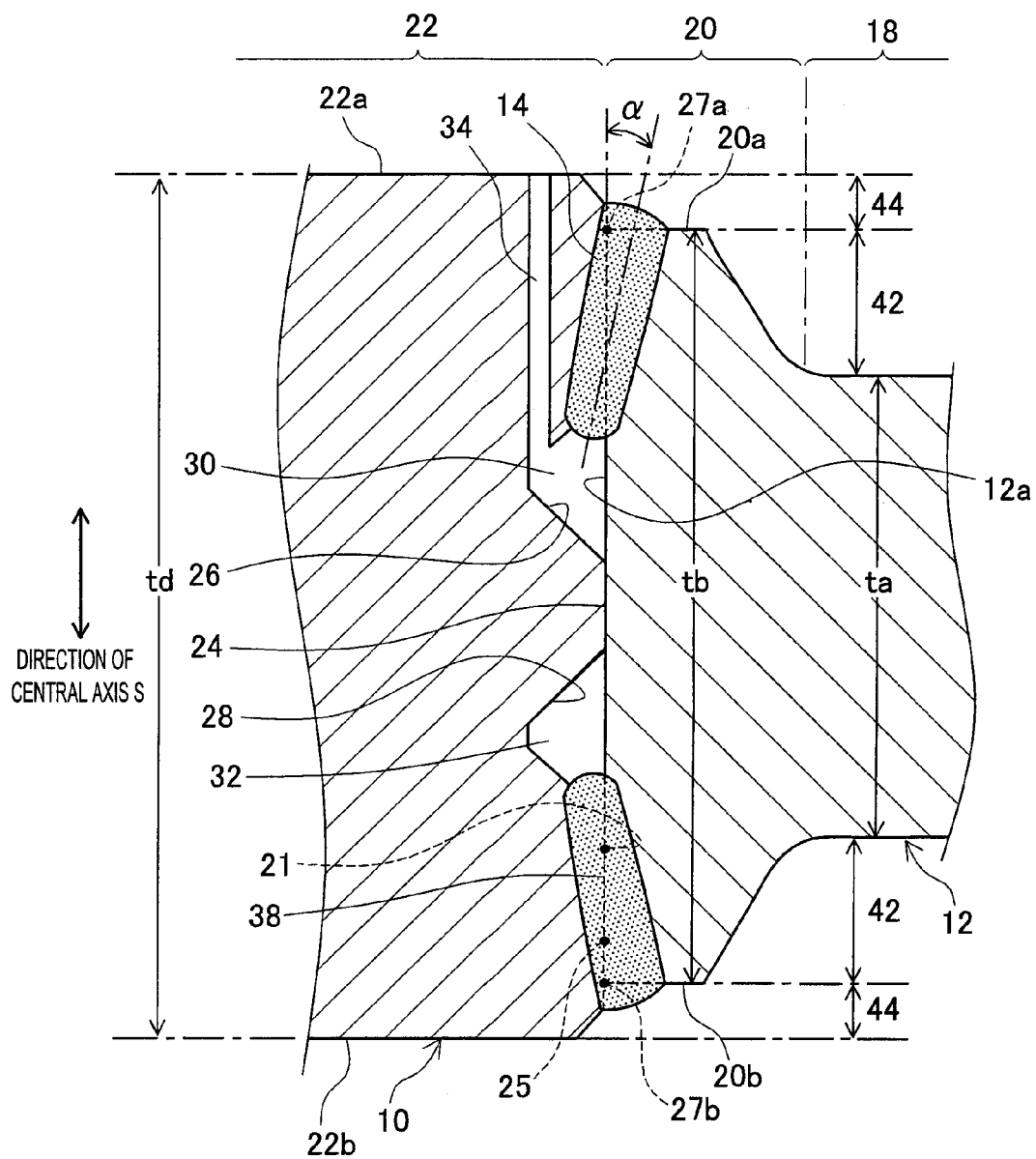
FIG. 3 is an enlarged view of a welded portion between the differential case and the ring gear in FIG. 2.

FIG. 2 is a cross section along A-A in FIG. 1, and FIG. 3 is an enlarged view of the joint portion between the differential case 10 and the ring gear 12 in FIG. 2.

As shown in FIGS. 2 and 3, the differential case 10 and the ring gear 12 are aligned in the radial direction (a first direction) of the ring gear 12. The central axis S direction of the ring gear 12 is a direction (a third direction) orthogonal to the radial direction of the ring gear 12. In this example, the direction (a second direction) in which the first weld beads 14 and the second weld beads 38 are formed in a joint surface 25 coincides with the direction (the third direction, or the central axis S direction) orthogonal to the radial direction of the ring gear 12.

The differential case 10 is provided with a gear joint portion 22 which will be joined to the ring gear 12. Here, the gear joint portion 22 is one example of a "first member joint portion" in the claims, and one part of the differential case 10. Namely, the "first member joint portion" in the claims is one part of the "second member". The ring gear 12 is provided with a case joint portion 20 which will be joined to the differential case 10. Here, the case joint portion 20 is one example of a "second member joint portion" in the claims, and one part of the ring gear 12. Namely, the "second member joint portion" in the claims is one part of the "first member". In the joint surface 25 where the case joint portion 20 and the gear joint portion 22 are joined together, the first weld beads 14 are formed from one end 27a, while the second weld beads 38 are formed from the other end 27b, of both ends in the central axis S direction of the ring gear 12.

The ring gear 12 is formed of the case joint portion 20, a connecting portion 18, and a toothed portion 16 aligned in this order along the radial direction from the joint surface 25 toward the outer periphery of the ring gear 12. The connecting portion 18 connects to the case joint portion 20 and the toothed portion 16, i.e., couples the case joint portion 20 and the toothed portion 16. The toothed portion 16 is formed with a teeth portion 16a on its outer periphery. In this example, a helical gear is formed in the teeth portion 16a.

As shown in FIG. 3, the gear joint portion 22 of the differential case 10 is provided with an abutment surface 21 to be abutted against an inner peripheral surface 12a of the ring gear 12 before welding the differential case 10 and the ring gear 12 together. This abutment surface 21 includes a press-fit portion 24 and a first groove 26 and a second groove 28 on both sides of this press-fit portion 24.

The press-fit portion 24 is provided substantially at the center of the abutment surface 21 in the central axis S direction of the ring gear 12. This press-fit portion 24 is provided for allowing the differential case 10 and the ring gear 12 to make press-fit with each other with a press-fit interference (allowance) between the inner peripheral surface 12a and the abutment surface 21 when inserting the differential case 10 into the inner peripheral surface 12a of the ring gear 12. Alternatively, surface portions of the abutment surface 21 located on both sides, in the central axis S direction of the ring gear 12, of the first groove 26, the press-fit portion 24, and the second groove 28 may serve as the press-fit portion. The first groove 26 and the second groove 28 respectively form a first cavity 30 and a second cavity 32 between themselves and the inner peripheral surface 12a of the ring gear 12. A press-fit portion may be provided in the inner peripheral surface 12a of the ring gear 12 instead of providing the press-fit portion 24 in the abutment surface 21 of the differential case 10.

The gear joint portion 22 of the differential case 10 is formed with through holes 34 extending from outside of the differential case 10 into the first cavity 30. Another through holes may additionally be provided so as to extend through the differential case 10 from outside into the second cavity 32. Alternatively, through holes may be formed in the case joint portion 20 of the ring gear 12 instead of or in addition to the through holes in the gear joint portion 22 of the differential case 10.

In this example, welding is performed from two directions on both sides of the ring gear 12 in its central axis S direction, thereby forming the first weld beads 14 and the second weld beads 38, respectively. Each of the first weld beads 14 and the second weld beads 38 is a layer of welded metal deposited in the joined portion of the gear joint portion 22 of the differential case 10 and the case joint portion 20 of the ring gear 12 when they are joined together by welding.

The first weld beads 14 are formed between one end 27a of the joint surface 25 in the central axis S direction and the first cavity 30, while the second weld beads 38 are formed between the other end 27b of the joint surface 25 in the central axis S direction and the second cavity 32. The first weld beads 14 and the second weld beads 38 are formed along directions inclined at an angle α relative to the abutment surface 21 of the gear joint portion 22 of the differential case 10.

The overall welded structure of this example is as described above.

Next, the characteristic features and advantageous effects of the welded structure of this example will be described.

As shown in FIG. 3, there are provided the first cavity 30 and the second cavity 32. Welding is performed such as to form the first weld beads 14 and the second weld beads 38 respectively between one end 27a of the joint surface 25 and the first cavity 30, and between the other end 27b of the joint surface 25 and the second cavity 32 (hereinafter referred to as "piercing welding"). This allows the gas generated when the differential case 10 melts during welding to be exhausted into the first cavity 30 and the second cavity 32. Therefore, by such piercing welding with the first cavity 30 and the second cavity 32, the formation of blow holes can be prevented. A tolerable amount of gas exhausted into the first cavity 30 and the second cavity 32 can be readily adjusted by adjusting the depth of the first groove 26 and the second groove 28.

Figure 4:
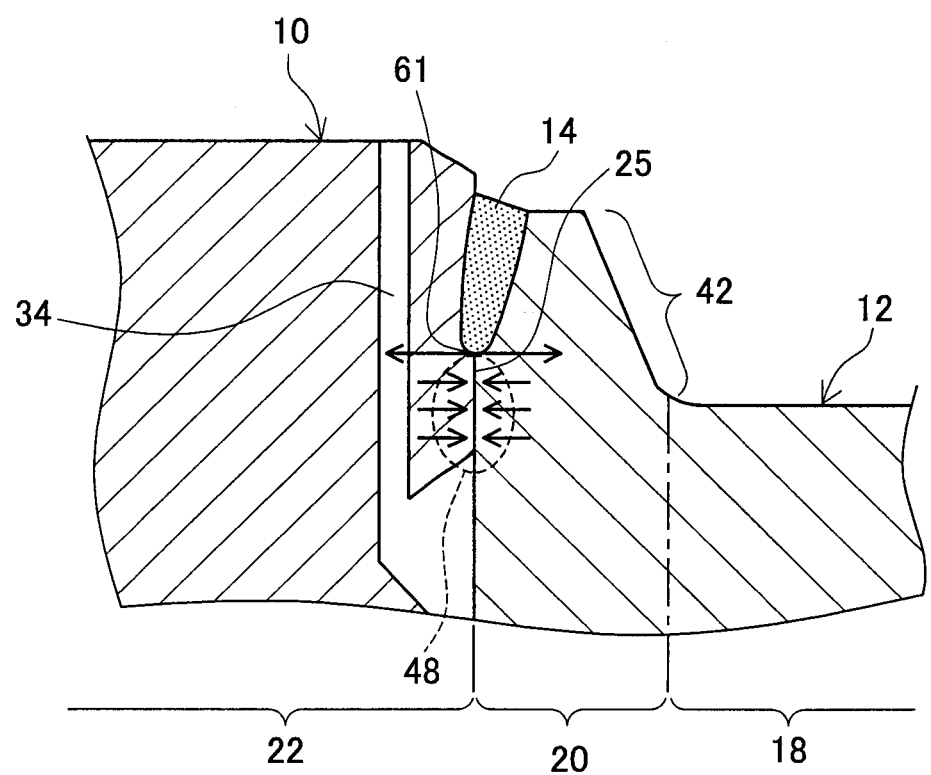
FIG. 4 is a diagram showing a state where compressive stress occurs in a concentrated manner in a non-welded portion.

Let us now assume a case where a non-welded portion 48 is provided between the first weld beads 14 and the first cavity 30. As shown in FIG. 4, as the first weld beads 14 and the surrounding thermally affected parts contract on cooling after welding, the non-welded portion 48 will inhibit the contraction in directions indicated by arrows, whereby there remains some tensile stress as indicated by arrows in first weld bead interface 61. Such residual tensile stress may cause cracks to be readily formed from the first weld bead interface 61 when a load is applied thereto in actual operation of the differential gear. On the other hand, there will be no such risk with piercing welding with which a non-welded portion 48 is not formed as in this example. Accordingly, weld strength and weld quality are improved by the piercing welding with the first cavity 30 and the second cavity 32.

Also, as shown in FIG. 3, the press-fit portion 24 is provided to the abutment surface 21 of the gear joint portion 22 of the differential case 10. The gear joint portion 22 is inserted into the inner periphery of the ring gear 12 with the press-fit portion 24 press-fitted into the inner peripheral surface 12a of the ring gear 12. Therefore, the positional relationship between the differential case 10 and the ring gear 12 can be maintained before and after welding. Accordingly, weld distortion can be reduced by the provision of the press-fit portion 24.

Also, as shown in FIG. 2, the press-fit portion 24 is provided at a position further in the direction in which a laser beam 23 is irradiated. Therefore, the laser beam 23 irradiated to form the first weld beads 14 and the second weld beads 38 hits against and is interrupted by the press-fit portion 24. Accordingly, when forming weld beads on one side after forming weld beads on the other side (for example, when forming the second weld beads 38 after forming the first weld beads 14), there is no risk of re-heating the previously formed weld beads on one side with the laser beam for forming the weld beads on the other side. Thus, with the press-fit portion 24 being provided at a position further in the direction in which the laser beam 23 is irradiated, weld strength and weld quality can be improved.

When laser beams 23 are simultaneously irradiated from two directions on both sides in the central axis S direction of the ring gear 12 to form the first weld beads 14 and the second weld beads 38, they do not interfere with each other since the laser beams 23 from two directions hit against and are interrupted by the press-fit portion 24. Accordingly, with the press-fit portion 24 being provided at a position further in the direction in which the laser beam 23 is irradiated, safety in the welding equipment can be improved.

In this example, welding is performed from two directions on both sides in the central axis S direction of the ring gear 12 to form the first weld beads 14 and the second weld beads 38. Therefore, a molten component (such as Ni) of the weld wire 40 is contained more at a smaller weld penetration depth than at a larger weld penetration depth both in the first weld beads 14 and the second weld beads 38, i.e., the distribution of the molten component of the weld wire 40 in the weld penetration direction is more or less equal. Accordingly, the first weld beads 14 and the second weld beads 38 have a uniform material strength against bending stress applied thereto in actual operation of the differential gear. Thus, weld strength and weld quality can be improved by performing welding from two directions on both sides in the central axis S direction of the ring gear 12 to form the first weld beads 14 and the second weld beads 38.

Also, the distribution of heat input can be made uniform during welding along the central axis S direction of the ring gear 12 in portions where the first weld beads 14 and the second weld beads 38 will be formed. Therefore, weld distortion can be suppressed by performing welding from two directions on both sides in the central axis S direction of the ring gear 12.

As shown in FIGS. 2 and 3, welding is performed to form the first weld beads 14 and the second weld beads 38 along directions inclined at an angle α relative to the abutment surface 21 of the gear joint portion 22 of the differential case 10 toward the ring gear 12 side (hereinafter referred to as "inclined welding"). Therefore, the melting amount of the differential case 10 (made of cast iron) that produces more gas when molten than the ring gear 12 (made of steel) during welding can be reduced, whereby the amount of generated gas can be reduced. Accordingly, the formation of blow holes can be suppressed by performing the inclined welding.

Also, in the event of rupture of the first weld beads 14 and the second weld beads 38, the ring gear 12 will be caught in the differential case 10 and not come off, so that the ring gear 12 is prevented from dropping out.

Further, as shown in FIGS. 2 and 3, through holes 34 are provided to extend through the differential case 10 from outside into the first cavity 30. Therefore, by observing the reflection light of the laser beam 23 in the first groove 26 during welding through the through holes 34, it can be determined whether or not piercing welding has been successfully done wherein the first weld beads 14 are formed through to the first cavity 30. Accordingly, weld quality can certainly be improved by the provision of the through holes 34.

Gas accumulated inside the first cavity 30 escapes from the through holes 34 so that expansion of gas inside the first cavity 30 can hardly occur, whereby formation of pinholes in the first weld beads 14 can be prevented. Also, any water droplets generated by possible condensation inside the first cavity 30 on cooling after welding can be drained from the through holes 34, so that corrosion of the first weld beads 14 can be prevented. Thus, weld quality is improved by the provision of the through holes 34. Similar effects could be achieved with respect to the second weld beads 38 if through holes are provided in the differential case 10 to extend from outside into the second cavity 32.

As shown in FIGS. 2 and 3, in the central axis S direction of the ring gear 12, the dimension of the connecting portion 18 is denoted by ta, the dimension between the end face 20a and the end face 20b of the case joint portion 20 is denoted by tb, and the dimension of the toothed portion 16 is denoted by tc.

In the differential gear having the welded structure between the differential case 10 and the ring gear 12 of this example, a thrust load (external force) is applied to the toothed portion 16 in the central axis S direction of the ring gear 12 (direction indicated by a thick arrow in FIG. 2) by power transmission from a drive pinion (not shown) in actual operation. When a bending moment is applied in directions indicated by thin arrows in FIG. 2 because of such a thrust load, the first weld beads 14 and the second weld beads 38 are subjected to compressive stress or tensile stress.

In this example, dimensions are to be ta<tb. Therefore, the case joint portion 20 has an increased modulus of section and improved bending rigidity. Because of this, despite the thrust load acting in the central axis S direction, the compressive stress and tensile stress applied to the first weld beads 14 and the second weld beads 38 are reduced. Thus, by making the dimensions to be ta<tb, weld strength between the differential case 10 and the ring gear 12 is improved.

Because the dimensions are made to be ta<tb, as shown in FIG. 3, the case joint portion 20 of the ring gear 12 has a protruded portion 42 extending out from the connecting portion 18 in the central axis S direction of the ring gear 12. In this protruded portion 42, the radial dimension of the ring gear 12 is small and an opposite surface to the joint surface 25 in the radial direction of the ring gear 12 is open or exposed. Therefore, this protruded portion 42 has a small heat capacity and low rigidity. In welding at the joint surface 25, therefore, as the temperature in the protruded portion 42 rises and its Young's module lowers, the protruded portion 42 can readily deform with expansion thereof as indicated by a broken line in a direction of an arrow in FIG. 5.

The protruded portion 42 can also deform with contraction thereof as the temperature falls on cooling after welding. Therefore, formation of cracks in the first weld beads 14 and the second weld beads 38 and their thermally affected parts can be suppressed during welding and on cooling after welding. Thus, by making the dimensions to be ta<tb, weld quality is improved. The radial dimension of the ring gear 12 in its protruded portion 42 may be made as small as possible to further reduce its heat capacity and to lower the rigidity.

Further, with the modulus of section of the case joint portion 20 being increased, weld strength can be secured without making the penetration depth of the first weld beads 14 and the second weld beads 38 very large. Heat input during welding is thereby reduced. Thus, by making the dimensions to be ta<tb, weld distortion and welding equipment cost can be reduced.

Also, the dimensions are made to be tb<tc as shown in FIG. 2. By making the dimension tb of the case joint portion 20 smaller, the weight of the ring gear 12 is reduced. Also, the case joint portion 20 has a smaller cross-sectional area, so that stirring resistance between lubricating oil (not shown) filling up around the ring gear 12 and the ring gear 12 generated when the ring gear 12 rotates around the central axis S in actual operation of the differential gear can be reduced.

Figure 5:
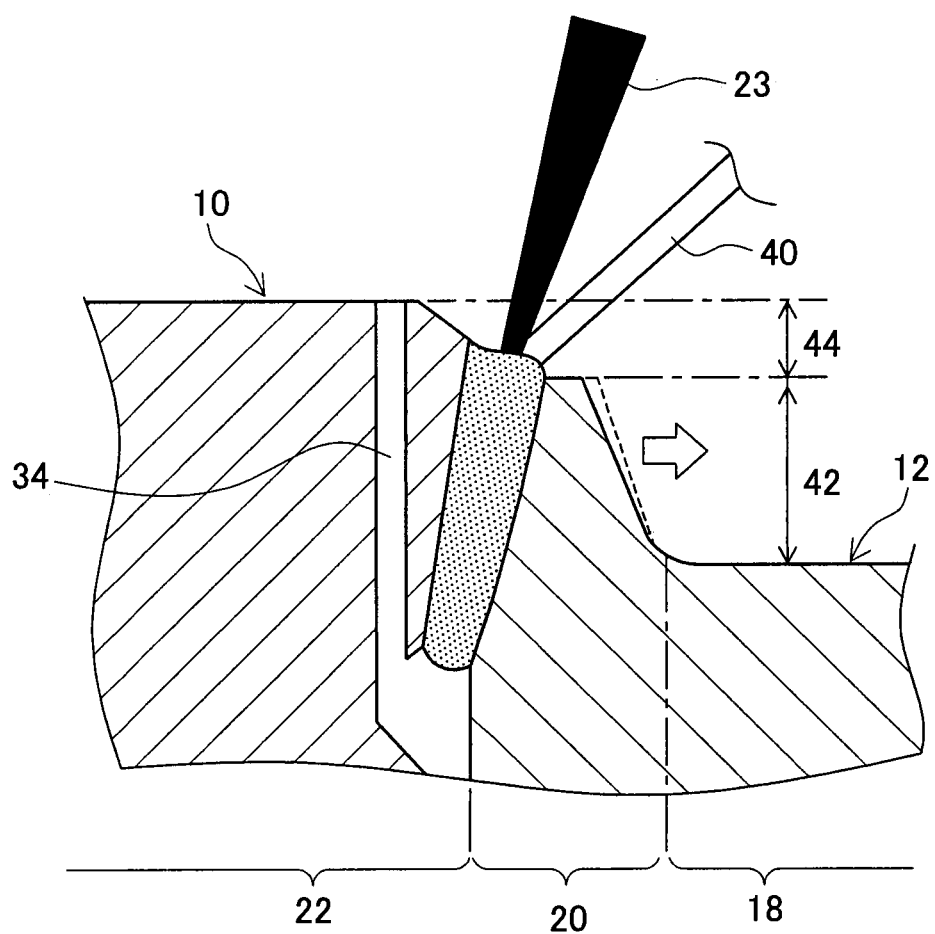
FIG. 5 is a view showing a state of a protruded portion during welding.

Also, as shown in FIGS. 2 and 3, in the central axis S direction of the ring gear 12, the dimension between the end face 22a and the end face 22b of the gear joint portion 22 of the differential case 10 is denoted by td. In this example, the dimensions are made to be tb<td. Thereby, a step 44 is formed respectively between the end face 20a of the case joint portion 20 of the ring gear 12 and the end face 22a of the gear joint portion 22 of the differential case 10, and between the end face 20b of the case joint portion 20 of the ring gear 12 and the end face 22b of the gear joint portion 22 of the differential case 10. Therefore, when welding the ring gear 12 and the differential case 10 together with their inner peripheral surface 12a and the abutment surface 21 abutted on each other, the weld wire 40 can be conformed (contacted) to the portions of these steps 44 as shown in FIG. 5 so that the weld wire 40 will not be displaced further toward the differential case 10. Thus, by making the dimensions to be tb<td, displacement of the weld wire 40 during welding can be prevented.

Figure 6:
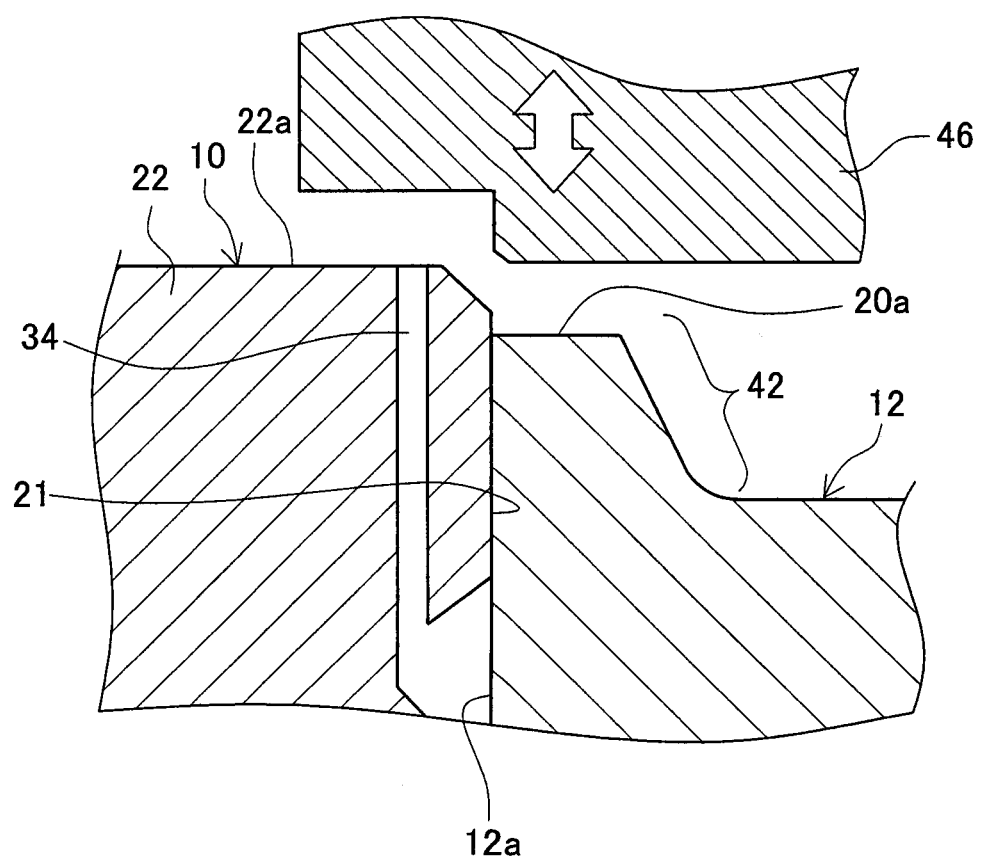
FIG. 6 is a view showing a state where the ring gear is positioned with a positioning jig.

Further, as shown in FIGS. 2 and 3, the end faces 20a and 20b in the central axis S direction of the case joint portion 20 of the ring gear 12 are formed flat along the radial direction of the ring gear 12. Therefore, the differential case 10 and the ring gear 12 can be accurately positioned by placing a positioning jig 46 for the ring gear 12 in contact with one or both of the end faces 20a and 20b. FIG. 6 shows an example where the differential case 10 and the ring gear 12 are positioned with the positioning jig 46 placed in contact with the end face 20a. Either the end face 20a alone, or the end face 20b alone, may be formed flat along the radial direction of the ring gear 12. By forming at least one of the end faces 20a and 20b flat along the radial direction of the ring gear 12 in this manner, the differential case 10 and the ring gear 12 can be accurately positioned using the positioning jig 46.

Example 2

Figure 7:
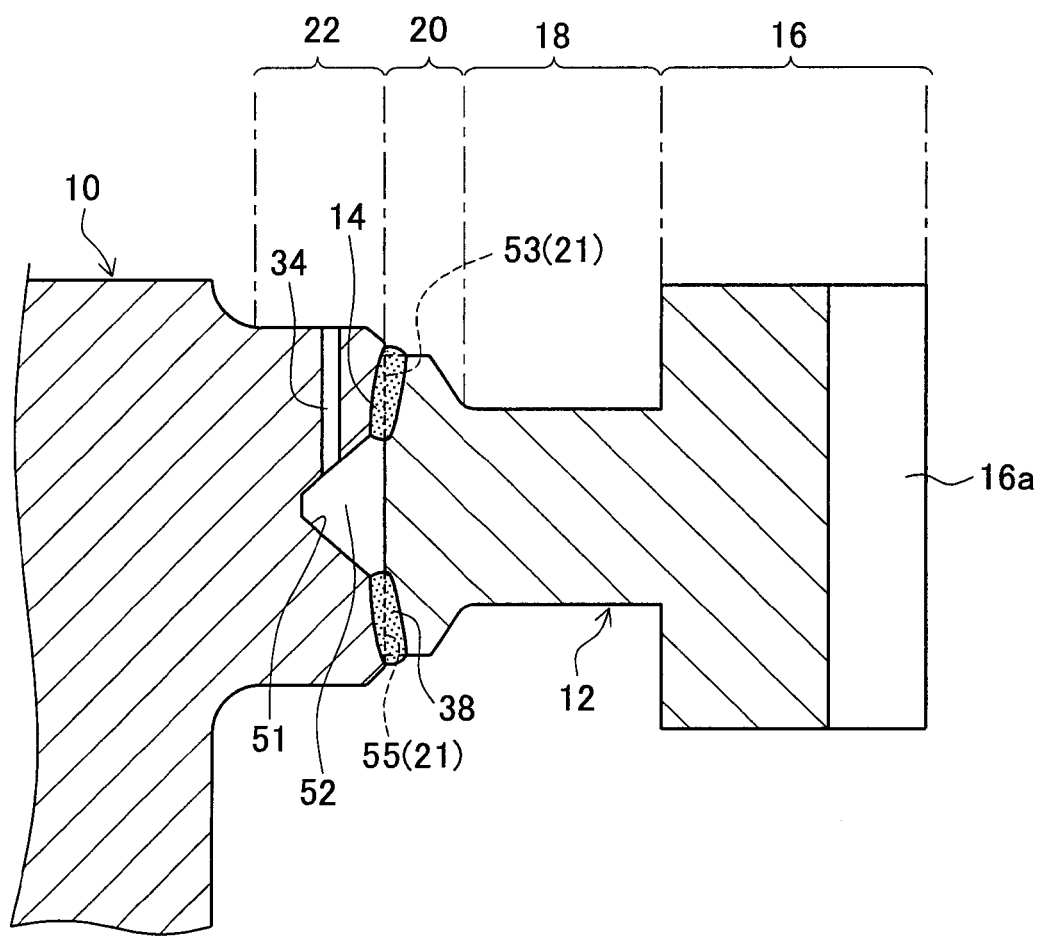
FIG. 7 is a view showing a second embodiment.

There could be Example 2 as shown in FIG. 7.

Example 2 is different from Example 1 in that no press-fit portion 24 is formed in the differential case 10. It is also different from Example 1 in that the differential case 10 is formed with a groove 51 in the abutment surface 21 so that it includes a cavity 52 formed between this groove 51 and the inner peripheral surface 12a of the ring gear 12. The cavity 52 has a larger cross-sectional area than the sum of the cross-sectional areas of the first cavity 30 and the second cavity 32 of Example 1. Therefore, more gas that may be generated when the differential case 10 melts during welding can be exhausted into the cavity 52. Thus, according to Example 2, the formation of blow holes can be more reliably suppressed because of the increased tolerable amount of gas that can be exhausted into the cavity 52. Also, because no press-fit portion 24 is provided, the number of mechanical machining processes is reduced, and the production cost can be reduced.

In Example 2, the gear joint portion 22 before welding is provided with abutment surfaces 53 and 55 on both sides of the groove 51 to be abutted against the case joint portion 20. When inserting the differential case 10 into the inner periphery of the ring gear 12 before welding, it is preferable to press fit the differential case 10 into the inner peripheral surface 12a of the ring gear 12 using at least one of the abutment surfaces 53 and 55.

There could also be a modified example where no through holes 34 are provided, if, due to the increased tolerable amount of gas that can be exhausted into the cavity 52, pin hole defects of the first weld beads 14 and the second weld beads 38 caused by expansion of gas inside the cavity 52 are unlikely to occur.

Example 3

Figure 8:
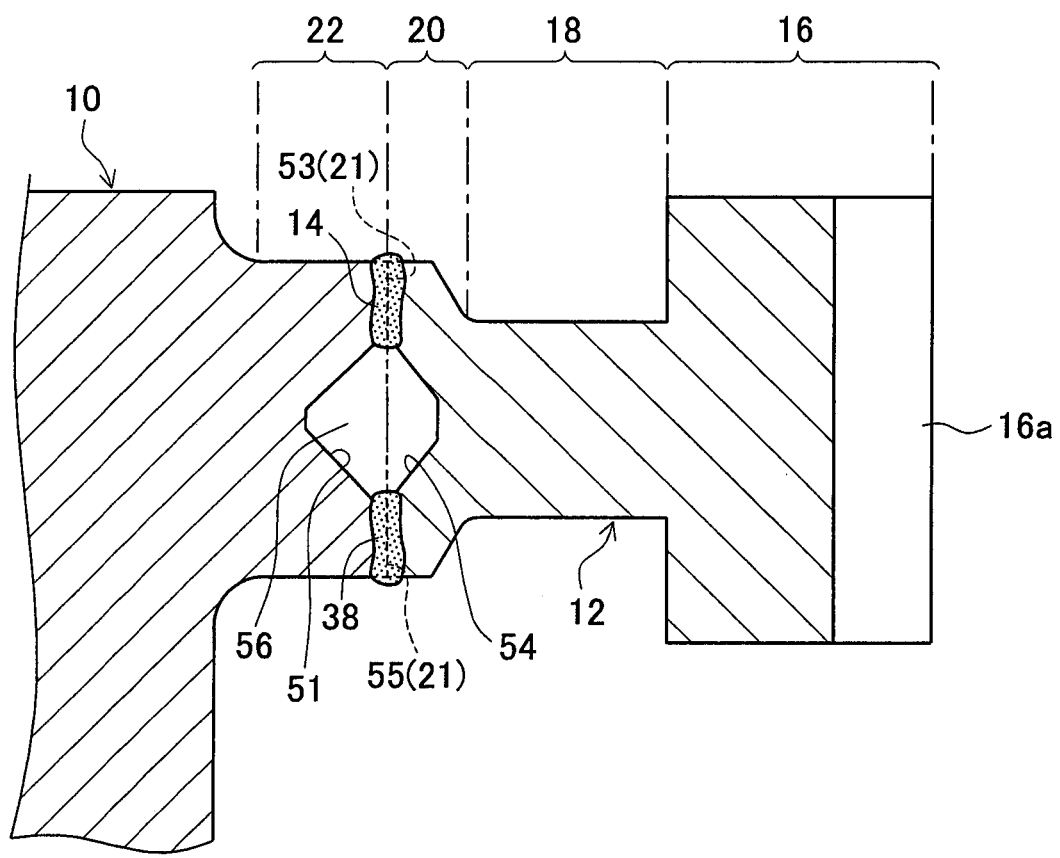
FIG. 8 is a view showing a third embodiment.

There could be Example 3 as shown in FIG. 8.

In Example 3, a groove 54 is provided in the inner peripheral surface 12a of the ring gear 12 in addition to the groove 51 in Example 2. Thus it includes a cavity 56 formed between the grooves 51 and 54. This cavity 56 has a larger cross-sectional area than that of the cavity 52 of Example 2. Therefore, more gas that may be generated when the differential case 10 melts during welding can be exhausted into the cavity 56. Thus, the formation of blow holes can be even more reliably suppressed because of the increased tolerable amount of gas that can be exhausted into the cavity 56 by the provision of the groove 54 in the ring gear 12.

Because of the large tolerable amount of gas that can be exhausted into the cavity 56, pin hole defects caused by expansion of gas inside the cavity 56 are unlikely to occur in the first weld beads 14 and the second weld beads 38. Therefore, the necessity to provide the through holes extending from the cavity 56 to outside of the differential case 10 is lowered.

As with Example 2, when inserting the differential case 10 into the inner periphery of the ring gear 12 before welding, it is preferable to press fit the differential case 10 into the inner peripheral surface 12a of the ring gear 12 using at least one of the abutment surfaces 53 and 55.

The previously described step 44 may be formed between the gear joint portion 22 and the case joint portion 20 as required. The inclined welding may also be performed.

Example 4

Figure 9:
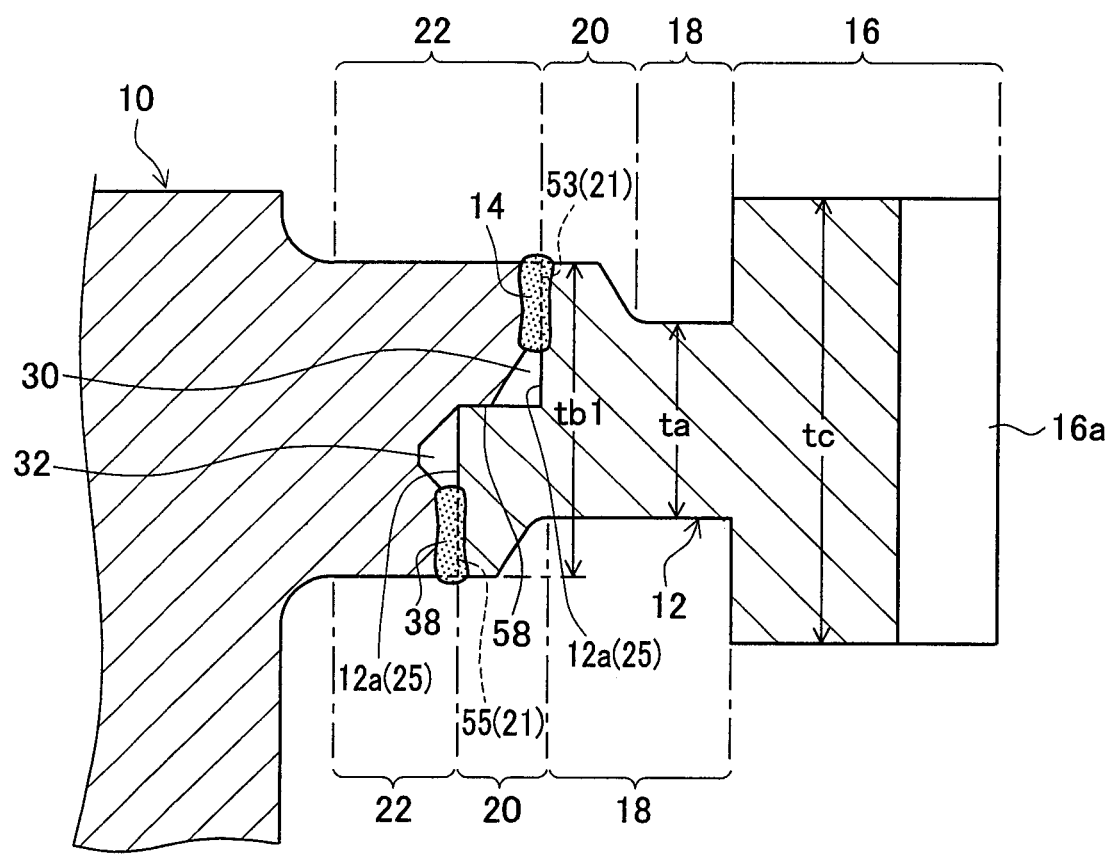
FIG. 9 is a view showing a fourth embodiment.

There could be Example 4 as shown in FIG. 9.

In Example 4, the inner peripheral surface 12a of the ring gear 12 is split into parts which are respectively positioned differently in the radial direction. In this example, the inner peripheral surface 12a forms the joint surface 25 where the case joint portion 20 and the gear joint portion 22 are joined together.

While the direction (a second direction) in which the first weld beads 14 and the second weld beads 38 are formed in the joint surface 25 coincided with the direction (a third direction, central axis S direction) orthogonally intersecting the radial direction of the ring gear 12 in the previously described Examples 1 to 3, the direction (the second direction) in which the first weld beads 14 and the second weld beads 38 are formed in the joint surface 25 does not coincide with the direction (the third direction, central axis S direction) orthogonally intersecting the radial direction of the ring gear 12 in Examples 4 and 5 described below.

With the respective parts of the split inner peripheral surface 12a being at different positions in the radial direction, and with the abutment surfaces 53 and 55 of the differential case 10 matched with the positions of the inner peripheral surface 12a as shown in FIG. 9, the first weld beads 14 and the second weld beads 38 are at different positions respectively in the radial direction of the ring gear 12. Thereby, a laser beam 23 irradiated in the central axis S direction of the ring gear 12 during welding hits against and is interrupted by the differential case 10 or the ring gear 12. Therefore, the laser beam 23 irradiated to form weld beads on one side does not irradiate and re-heat the weld beads formed on the other side. Accordingly, weld strength and weld quality can be improved.

Even when the laser welding is performed simultaneously from two directions on both sides of the central axis S direction of the ring gear 12, the laser beams 23 irradiated from two directions do not interfere with each other. Therefore, safety of the welding equipment is improved. Also, since there is no need to perform inclined welding, the welding equipment can be made simple and the production cost can be reduced.

In the event of rupture of the first weld beads 14 and the second weld beads 38, the ring gear 12 will be caught in the differential case 10 and not come off, so that the ring gear 12 is prevented from dropping out.

Further, the differential case 10 and the ring gear 12 are butted against each other in the central axis S direction of the ring gear 12 at a butted portion 58. Thereby they have an increased strength against the thrust load.

In this example, dimensions are made to be ta<tb1, where tb1 represents the dimension of the case joint portion 20 in the central axis S direction of the ring gear 12. Thereby, as with Examples 1 to 3, weld strength and weld quality between the differential case 10 and the ring gear 12 are improved, and weld distortion and welding equipment cost can be reduced.

By making the dimensions to be tb1<tc, as with Examples 1 to 3, the ring gear 12 can be made more lightweight, and stirring resistance can be reduced.

As with Examples 2 and 3, when inserting the differential case 10 into the inner periphery of the ring gear 12 before welding, it is preferable to press fit the differential case 10 into the inner peripheral surface 12a of the ring gear 12 using at least one of the abutment surfaces 53 and 55.

Depending on the needs, through holes extending from the first cavity 30 to outside, or through holes extending from the second cavity 32 to outside may be provided in the differential case 10. Also, the previously described step 44 may be provided between the gear joint portion 22 and the case joint portion 20 as required.

Example 5

Figure 10:
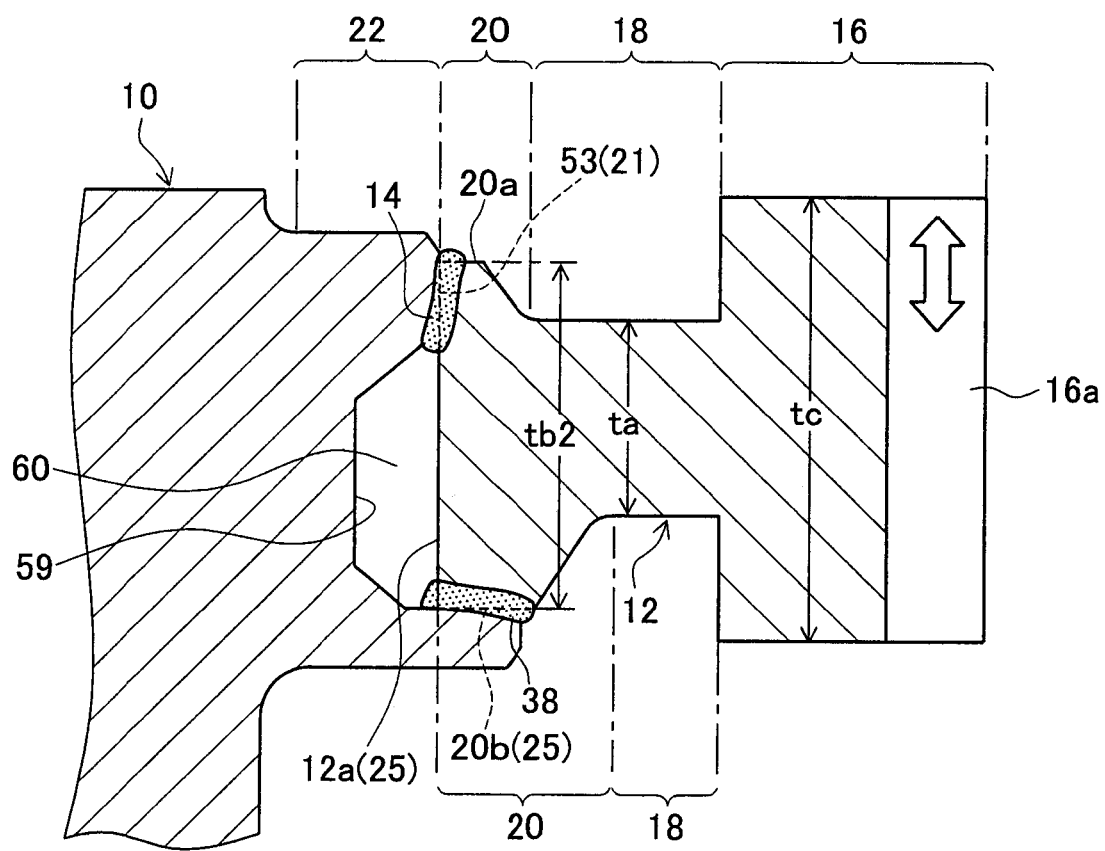
FIG. 10 is a view showing a fifth embodiment.
Figure 11:
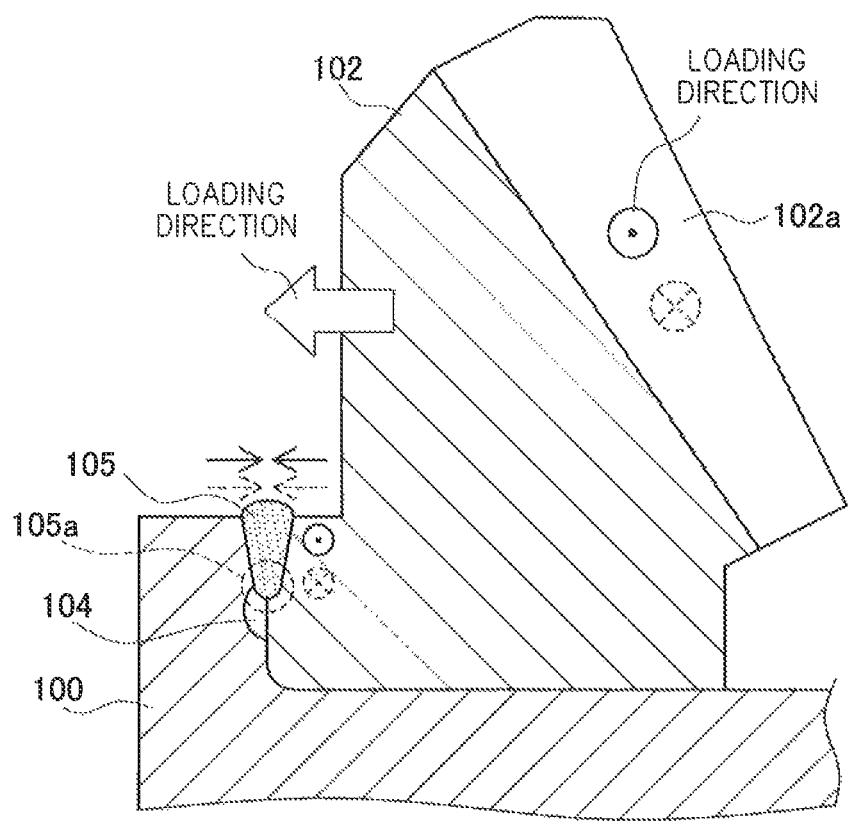
FIG. 11 is a view showing a conventional example using a ring gear of a hypoid gear.
Figure 12:
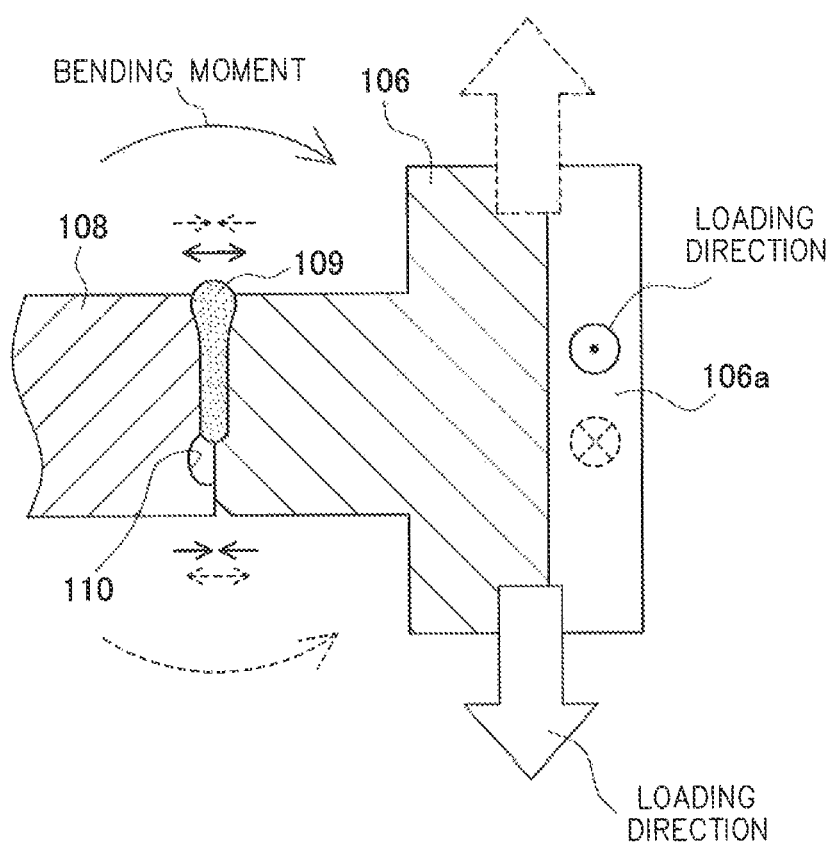
FIG. 12 is a view showing a conventional example using a ring gear of a helical gear.

There could be Example 5 as shown in FIG. 10.

In Example 5, the joint surface 25 where the case joint portion 20 and the gear joint portion 22 are joined together consists of a surface formed of the inner peripheral surface 12a of the ring gear 12 and the end face 20b of the case joint portion 20 (surface formed by connecting a plurality of surfaces oriented in different directions). The second weld beads 38 are formed along the end face 20b of the case joint portion 20 so that the second weld beads 38 are formed substantially in the radial direction of the ring gear 12. Thereby, weld strength is improved even when, for example, a thrust load is unevenly applied to the upper side in the drawing as shown in FIG. 10 of the toothed portion 16 by power transmission from the drive pinion (not shown) in actual operation of the differential gear.

In the case where such bending stress as described above is unevenly applied to the lower side of the drawing, weld strength may be improved by inverting the directions in which the first weld beads 14 and the second weld beads 38 are formed from those of the example of FIG. 10.

Also, the laser beam 23 irradiated to form weld beads on one side does not re-heat the weld beads already formed on the other side during welding. Accordingly, weld quality can be improved. Moreover, even when the laser welding is performed from two directions on both sides of the central axis S direction of the ring gear 12, the laser beams 23 irradiated from two directions do not interfere with each other. Therefore, safety of the welding equipment can be improved.

In this example, dimensions are made to be to <tb2, where tb2 represents the dimension of the case joint portion 20 in the central axis S direction of the ring gear 12. Thereby, as with Examples 1 to 4, weld strength and weld quality between the differential case 10 and the ring gear 12 are improved, and weld distortion and welding equipment cost can be reduced.

By making the dimensions to be tb2<tc, as with Examples 1 to 4, the ring gear 12 can be made more lightweight, and stirring resistance can be reduced.

When inserting the differential case 10 into the inner periphery of the ring gear 12 before welding, it is preferable to press fit the differential case 10 into the inner peripheral surface 12a of the ring gear 12 using the abutment surface 53.

A cavity 60 is formed between the groove 59 in the abutment surface 21 and the inner peripheral surface 12a. Depending on the needs, through holes extending from this cavity 60 to outside may be formed in the differential case 10.

It will be appreciated that the foregoing embodiments are given for illustrative purposes only and not to be construed as limiting the present invention but rather the subject matter of the invention can be variously modified and altered without departing from its scope.

While the welded structure between a differential case and a ring gear of a differential gear was described as one example in the foregoing Examples, the present invention is not limited to this example. For example, the invention is applicable to a welded structure between other annular parts and components inserted into the inner peripheral surface of annular parts, or a welded structure between bar-like members or plate-like members.

As long as the weight of the ring gear 12 and stirring resistance between the ring gear 12 and lubricating oil (not shown) when the ring gear 12 rotates are within a permissible range, the dimension tb of the case joint portion 20 in the central axis S direction of the ring gear 12 may be made larger than the dimension tc of the toothed portion 16 (tb>tc).

DESCRIPTION OF THE REFERENCE SIGNS

10 Differential case
12 Ring gear
12a Inner peripheral surface
14 First weld bead
16 Toothed portion
16a Teeth portion
18 Connecting portion
20 Case joint portion
20a End face
20b End face
21 Abutment surface
22 Gear joint portion
22a End face
22b End face
23 Laser beam
24 Press-fit portion
25 Joint surface
27a End face
27b End face
30 First cavity
32 Second cavity
34 Through hole
38 Second weld bead
40 Weld wire
42 Protruded portion
44 Step
46 Positioning jig
52 Cavity
53 Abutment surface
55 Abutment surface
56 Cavity
60 Cavity
61 First weld bead interface
α Angle
S Center axis

The invention claimed is:

1. A welded structure of a first member and a second member joined together by welding,
wherein the first member includes a second member joint portion joined to the second member,
the second member includes a first member joint portion joined to the first member,
when the first member and the second member are aligned along a first direction and a second direction is a direction intersecting the first direction,
the welded structure includes a cavity formed between the first member joint portion and the second member joint portion,
a welded portion formed between the cavity and each end in the second direction of a joint surface where the first member joint portion and the second member joint portion are joined together, and
the cavity is formed by a groove provided at least to one of the first member and the second member.

2. The welded structure according to claim 1 includes a through hole extending from outside into the cavity.

3. The welded structure according to claim 1,
wherein the first member is an annular member whose radial direction coincides with the first direction,
the welded structure includes a press-fit portion on one of an inner peripheral surface of the first member and an abutment surface of the first member joint portion of the second member that abuts against the inner peripheral surface for allowing press-fit to be made with a press-fit interference between the inner peripheral surface and the abutment surface.

4. The welded structure according to claim 3,
wherein the cavity includes a first cavity and a second cavity,
the first cavity and the second cavity are arranged respectively on both sides of the press-fit portion in the second direction.

5. The welded structure according to claim 1,
wherein the second member is made of a material that generates more gas when molten than the first member, and
the welded portion is formed along a direction inclined toward the first member side relative to the joint surface.

6. A welded structure of a first member and a second member joined together by welding,
wherein the first member includes a second member joint portion joined to the second member,
the second member includes a first member joint portion joined to the first member,
when the first member and the second member are aligned along a first direction and a second direction is a direction intersecting the first direction,
the welded structure includes a welded portion formed at least at each end in the second direction of a joint surface where the first member joint portion and the second member joint portion are joined together,
the second member is made of a material that generates more gas when molten than the first member, and
the welded portion is formed along a direction inclined toward the first member side relative to the joint surface.

7. The welded structure according to claim 1,
wherein the first member is a ring gear of a differential gear, and the second member is a differential case which is a housing member of the differential gear.

8. A welding method for joining a first member and a second member together by welding, the method comprising:
when the first member and the second member are aligned along a first direction, and a second direction is a direction intersecting the first direction, joining, to the second member, a second member joint portion of the first member and joining, to the first member, a first member joint portion of the second member,
wherein a cavity is defined between the first member joint portion and the second member joint portion, the cavity being defined by a groove provided in at least one of the first member and the second member; and
welding from both ends of a joint surface where the first member joint portion and the second member joint portion are joined together in the second direction so as to form welds between both ends of the joint surface in the second direction and the cavity.

9. The welding method according to claim 8,
wherein the first member or the second member is formed with a through hole extending from outside into the cavity.

10. The welding method according to claim 8,
wherein the first member is formed in an annular form such that its radial direction coincides with the first direction, the first member joint portion of the second member is formed with an abutment surface to be abutted against an inner peripheral surface of the first member, and the first member and the second member are press fitted to each other with a press-fit interference between the inner peripheral surface and the abutment surface.

11. A welding method for joining a first member and a second member together by welding, the method comprising:
when the first member and the second member are aligned along a first direction, and a second direction is a direction intersecting the first direction, joining, to the second member, a second member joint portion of the first member and joining, to the first member, a first member joint portion of the second member,
wherein the second member is made of a material that generates more gas when molten than the first member; and
welding from both ends of the joint surface in the second direction so as to form welds along a direction inclined toward the first member side relative to the joint surface at least at both ends of the second direction of the joint surface where the first member joint portion and the second member joint portion are joined together.

* * * * *